May 28, 1968  W. DUFFY ET AL  3,384,962
TILTING HEAD MECHANISM FOR SHEARS
Filed Sept. 14, 1965  2 Sheets-Sheet 2

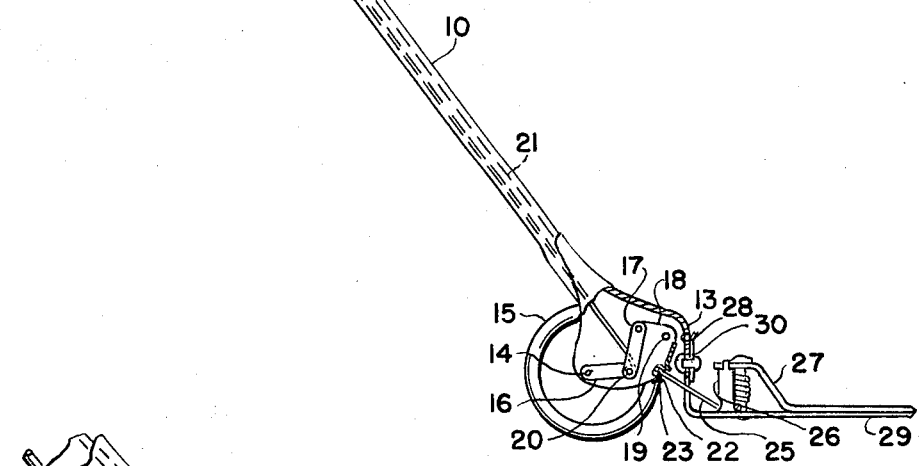
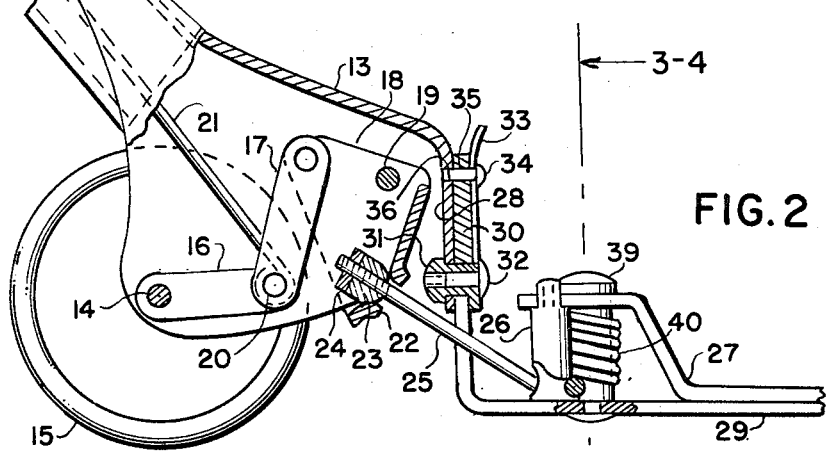

INVENTORS:
William Duffy &
John Students by Sparrow and Sparrow

ATTORNEYS.

United States Patent Office 3,384,962
Patented May 28, 1968

3,384,962
TILTING HEAD MECHANISM FOR SHEARS
William Duffy, Jamesburg, and John Students, Roselle Park, N.J., assignors to J. Wiss and Sons Co., Newark, N.J.
Filed Sept. 14, 1965, Ser. No. 487,172
5 Claims. (Cl. 30—248)

ABSTRACT OF THE DISCLOSURE

Long-handle garden shears having a tilting shear head which can be swivelled from a horizontal to a vertical shearing position and an actuating mechanism for the shears which works equally well in both positions of the head.

---

This invention relates generally to multi-purpose shears and particularly to shears which are used in gardening for cutting grass and for trimming grassy edges, and to improvements of the mechanisms of such shears.

Grass cutting and trimming shears may have long handles for the convenience of operating same without stooping, and such shears may have a tilting cutting head which can be swivelled from the horizontal to a vertical shearing position, with intermediate positions between the ultimate or extreme positions. Such shears have in common the fact that they are operated by hand, and the mechanism for such operation may comprise cables, rods and the like members or elements. The shearing action of the cutting blades obviously must not be obstructed or impeded by the tilting mechanism; and since the operation of the shearing mechanism is performed by one hand of the user, it is understood that this operation should be an easy one in both the horizontal and the vertical position of the shearing head.

This invention pertains to a new and improved long handle garden shears which has the advantages enumerated above. The invention consists in such novel features, construction arrangements, combination of parts and improvements as may be shown and described in connection with the device herein disclosed by way of example only and as illustrative of a preferred embodiment. It is understood that the invention also pertains to other kinds or types of multi-purpose shears. Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide long handle garden shears which is conveniently operable by hand from an upright position.

Another object of the present invention is to provide garden shears in which the blades may be positioned either horizontally or vertically for a cutting operation, and thus operated by a person while he is in an upright position.

Furthermore, it is an object of the present invention to provide an operating mechanism for shear blades which renders the operation of the shears efficiently and easy in both the horizontal and the vertical position of the shear blades with respect to the ground.

Yet another object of the present invention is to provide a multi-purpose cutting tool which is sturdy, yet light-weight and is composed of few, simple and uncomplicated parts.

A further object of the present invention is to provide a garden tool which can be manufactured economically and does not require much maintenance costs.

Various further and more specific purposes, features and advantages will clearly appear from the detailed description given below taken in connection with the accompanying drawings which form part of this specification and illustrate merely by way of example one embodiment of the device of this invention. In the following description and in the claims, parts will be identified by specific names for convenience, but such names are intended to be as generic in their application to similar parts as the art will permit. Like reference characters denote like parts in the several figures of the drawing, in which:

FIG. 1 shows in side elevation a long handle garden shears according to the invention, having a swivel-type cutting head (the housing of the operating mechanism being partly cut away for revealing the mechanism);

FIG. 2 shows in side elevation the swivel-type cutting head of the shears shown in FIG. 1, in an enlarged scale, in the horizontal cutting position of the shears;

Figure 3:
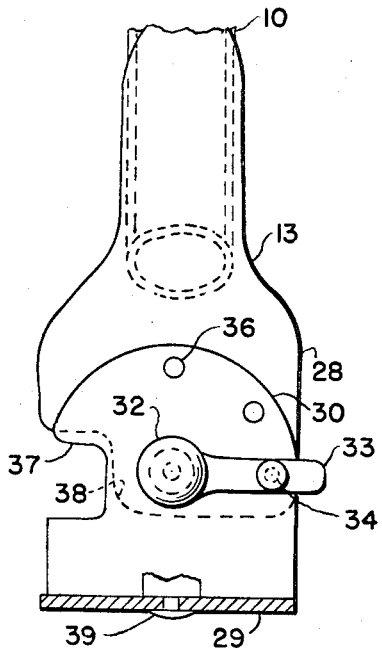
FIG. 3 is a face view of the swivel head, taken in the direction of the arrow III–IV in FIG. 2, in the horizontal cutting position of the shears.
Figure 4:
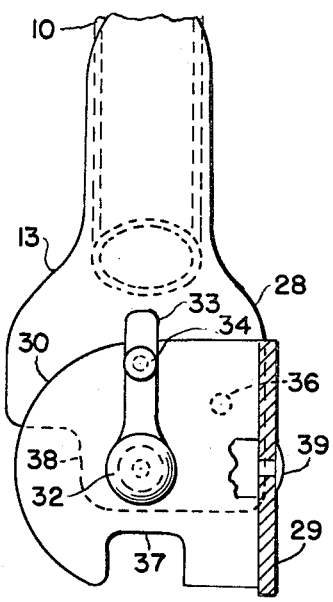
FIG. 4 is a face view of the swivel head, taken in the direction of the arrow III–IV in FIG. 2, in the vertical cutting position of the shears.

Referring now in more detail to the drawings which illustrate a preferred embodiment by which the invention may be realized, there is shown in FIG. 1 garden shears having a long handle or shaft 10 to which is connected at its upper end a part 11 provided with a hand grip 12 and which is connected at its lower end with an extension 13. As hereinafter explained, the shear mechanism and the swivel head are attached to extension 13. Shaft 10 is made preferably of tubing, but any other suitable construction may be used such as, for example, channel sections. Extension 13 is welded, brazed, riveted or otherwise connected to the lower end of handle or shaft 10, and is preferably so designed that it constitutes a housing for the operating mechanism, a support for an axle 14 on which wheels 15 are freely rotatably mounted, as well as a bracket or support means providing a downwardly directed front wall 28 utilized for purposes hereinafter explained.

A toggle link mechanism, consisting of a first link 16, a second link 17 and a bell crank 18, is suspended from axle 14 by first link 16, whereas bell crank 18 is rotatably mounted on a short shaft 19 which also is located in lower part 13. Links 16 and 17 are connected by a pivot or bolt 20 to which the pull rod 21 is attached. Second link 17 is connected to one arm of bell crank lever or means 18 whereas a ball socket 22 is formed on the other arm of bell crank lever 18. Ball socket 22 forms, together with a ball-shaped nut 23, a swivel joint. Nut 23 is secured by a counter-nut 24. Both nuts 23 and 24 are screwed on connecting member or pull rod 25 which is connected with a stud 26 on an extension of the movable blade 27 of the shears. The location of socket 22 in the bell crank should be close to the horizontal and vertical lines of the center of the blade fulcrum and the tilting fulcrum. In this manner, pull rod 25, at any given tilt of the head, generates a line from the tip to the base of a cone permitting connecting member or pull-rod 25 to swing in two plans perpendicular to one another and permitting adjustment of stationary blade 29 at any angle whereby connecting member 25 may be swung about the center of socket 22. It may then be seen that the length of this line is always the same and, as a consequence, the blade opening remains consistent regardless of the tilted or not tilted position of the head.

The front wall 28 of extension 13 provides a flat, vertical area on which the shears are tiltably located. The stationary blade 29 of the shears has a normally upright, substantially flat part or extension 30 which is located adjacent to and in front of wall 28. A bushing 31 is rotatably located in wall 28 and in upright wall of extension 30, the latter being held on bushing 31 adjacent wall 28 by a screw 32 which threadedly engages bushing 31. Thus, stationary blade 29 may be rotated about or with bushing 31 relative to and against front wall 28 for tilting the shears from a horizontal to a vertical position.

Disposed in a circumferential arc of 90° in bracket or support wall 28 are a plurality of holes or perforations 36. A spring latch or similar means associated with the upright wall or extension 30 of stationary blade 29 is adapted to cooperate with perforations 36 to hold or lock stationary blade 29 in a selective horizontal, vertical or intermediate tilting position. For this purpose, the latch may comprise a bolt or plug 34 slidable in a perforation or hole 36 in upright wall or extension 30 of stationary blade 29 with which engages a flexible spring steel finger 33 protruding from wall 30. Bolt or plug 34 is in selective arcuate register with perforations 36 in bracket wall 28. Thus, by retracting bolt or plug 34 by means of finger 33 and thus withdrawing it from engagement in wall 28, the shears proper, having the co-acting blades 27, 29, may be manually rotated about the horizontal axis provided by bushing 31 and then locked in a selective tilting position from horizontal to vertical by releasing spring finger 33 for register with the selective perforation 36.

Upright wall 30 of stationary blade 29 obviously has a cutout 37 through which pull rod 25 can extend, and front wall 28 has a corresponding cut-away portion 38. An upright stud 39 is fastened on stationary blade 29, serving as a pivot for movable blade 27 and a torsion spring 40 is wound around stud 39 for performing the return stroke of movable blade 27. The ends of torsion spring 40 are anchored in conventional manner in movable blade 27 and in stationary blade 29, respectively (not shown in the drawing).

An operating lever 41 is rotatably arranged on hand grip 12. The upper end of pull rod or member 21 is attached to lever 41. A latch 42 is provided on hand grip 12 for holding lever 41 by means of a small pin 43 in an inoperable position when the shears are stored when not in use. Thus, by operating lever 41 and thus manipulating pull member 21, the shears proper may be activated for a trimming or cutting operation.

Figure 5:
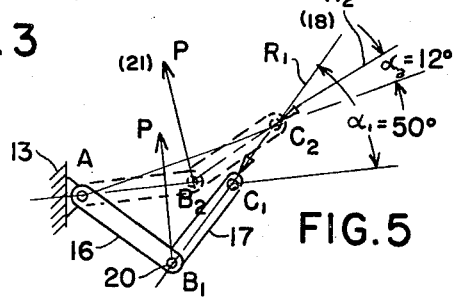
FIG. 5 is a force analysis of the toggle mechanism for for the operation of the shears.
Figure 6:
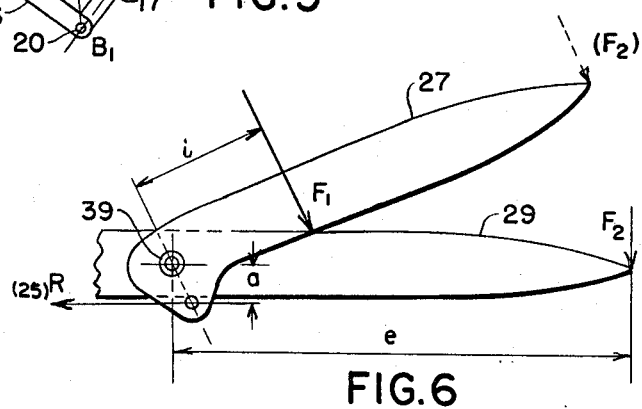
FIG. 6 is a force analysis of the shearing forces of the shear blades.

The toggle mechanism, combined with the tilting head, provides a new and important feature of a constant shearing force. This is illustrated in FIGS. 5 and 6.

The formula describing the forces in the toggle mechanism is:

$$P \cos \alpha = 2R \sin \alpha$$

$$R = \frac{P}{2} \frac{\cos \alpha}{\sin \alpha} = \frac{P}{2} \cot \alpha$$

In a preferred embodiment, the initial angle $\alpha$ might be:

$$\alpha_1 = 50°$$

and the final angle when the blades of the shears are closed might become:

$$\alpha_2 = 12°$$

P might be assumed equal to 150 lbs. Then:

$$R_1 = \frac{P}{2} \cot 50°$$

$$= \left(\frac{150}{2}\right) \times .839 = 63 \text{ lbs.}$$

When the blades are closed:

$$R_2 = \frac{P}{2} \cot 12°$$

$$= \left(\frac{150}{2}\right) \times 4.70 = 352 \text{ lbs.}$$

This shows that there is produced by the present invention a mechanism having a progressively improving mechanical advantage, the percent increase of force being:

$$\frac{R_2}{R_1} \times 100 = \frac{352}{63} \times 100 = 560\%$$

The bell crank might be constructed in such manner that both lever arms are equal. On the other hand, the actual cutting force on the blades of the shears decreases as the cut progresses from the start to the tip of the blades (FIG. 6). The force analysis for the two positions is:

$$r \times a = F_1 \times i$$
$$= F_2 \times e$$

With the assumption of dimensions of an example such as:

$$a = 1 \text{ inch}$$
$$i = 1.59 \text{ inch}$$
$$e = 7 \text{ inches}$$

and a constant force R, the following relations are found:

$$F_1 = \frac{R \times a}{i} \qquad F_2 = \frac{R \times a}{e}$$

$$\frac{F_2}{F_1} = \frac{\frac{Ra}{e}}{\frac{Ra}{i}} = \frac{Rai}{Rae} = \frac{i}{e} = \frac{1.59}{7} = .228 = 23\%$$

which indicates that (with the dimensions given in the example) a decrease of the cutting force by more than 75% occurs.

While the foregoing analyzed toggle force has increased, the combination of the decreased force of the cutting blades with the toggle force results in a substantially constant cutting force from start to end of the cutting action. Obviously, the mechanism of the tilting head must be such as to accommodate the practical use of the advantages of the toggle mechanism. By using the swivel arrangement combined with the swivel joint formed by the ball-and-socket construction at the end of the bell crank lever, such new and improved device can be attained. It is important to locate the socket in the bell crank in such manner that it be close to the horizontal and vertical lines of center of the blade fulcrum and the tilting fulcrum. When this condition occurs, pull rod 25, at any given tilt of the head, generates a line from the tip to the base of a cone. It may then be seen that the length of this line is always the same and as a consequence the blade opening remains consistent regardless of the tilted or not tilted position of the head.

While the invention has been described and illustrated with respect to a certain preferred example which gives satisfactory results, it will be understood by those skilled in the art after understanding the principle of the invention that various other changes and modifications may be made without departing from the spirit and scope of the invention and it is intended therefore in the appended claims to cover all such changes and modifications.

We claim:

1. Garden shears comprising a long handle, a stationary blade and a movable blade pivotally mounted on said stationary blade, support means on the lower portion of said handle, said support means having a downwardly-directed wall, means swivelly mounting said stationary blade on said wall in positions from horizontal to vertical, toggle means mounted on said support means, said toggle means comprising rotatably mounted first link means, second link means articulatedly linked to said first link means, bell crank means swingably mounted on said support means, said second link means being connected with said bell crank means, a connecting member, and swivel means connecting said connecting member and said bell crank means, said swivel means comprising a ball-and-socket device for swinging said connecting member in two plans perpendicular to one another and for adjustment of said stationary blade at any angle whereby said connecting member may be swung about the center of said means swivelly mounting said stationary blade on said wall, said connecting member being swingably connected to said movable blade, and means on said handle for activating said toggle means.

2. In garden shears having a long handle, an operating hand grip on one end of said handle, bracket means on the other end of said handle, at least one supporting wheel means on said bracket means, a stationary blade and a movable blade pivotally mounted on said stationary blade, the combination with means on said bracket means for tilting said stationary blade and said movable blade from horizontal to vertical positions, of toggle linkage means for operating said movable blade at a substantially constant cutting force, bell crank means connected with said toggle means, said bell crank means comprising connecting means having a swivel joint thereon, said connecting means being swingably connected with said movable blade.

3. Garden shears comprising a long handle, an operating hand grip on the upper end of said handle, bracket means on the lower end of said handle, an axle on said bracket, at least two wheels on said axle, a stationary blade and movable blade pivotally mounted on said stationary blade, a front wall on said bracket means, means swivelly mounting said stationary blade on said wall in positions from horizontal to vertical, a toggle mechanism mounted on said bracket means, said mechanism comprising a first link rotatably mounted on said axle, a second link articulatedly linked to said first link, said first and said second links providing a starting toggle angularity between substantially 45° and 55° and for a final angle between substantially 6° and 15° for generating a constant cutting force of said blades, bell crank means swingably mounted on said bracket means, said second link being connected with one arm of said bell crank means, a ball socket on the other arm of said bell crank means, and a connecting rod having a ball-shaped nut forming a swivel joint with said ball socket, for swinging said connecting rod in two plans perpendicular to one another and for adjustment of said stationary blade at any angle whereby said connecting rod may be swung about the center of said means swivelly mounting said stationary blade on said wall, said connecting rod being swingably attached to said movable blade.

4. In garden shears according to claim 1, further having operating pull means attached to said linking point of said first and said second link, said pull means being operably connected with said hand grip on said handle.

5. Garden shears comprising a long handle, a stationary blade, a movable blade pivotally mounted on said stationary blade, support means on the lower portion of said handle, said support means having a downwardly directed wall, means swivelly mounting said blade on said wall in positions from horizontal to vertical, toggle means mounted on said support means, said toggle means comprising rotatably mounted first link means, second link means articulatedly linked to said first link means, bell crank means swingably mounted on said support means, said second link means being connected with said bell crank means, a connecting member, swivel means connecting said connecting member and said bell crank means, said connecting member adapted to swing in two plans perpendicular to one another, whereby said stationary blade may be adjusted at substantially any angle and whereby said connecting member may be swung about the center of said means swivelly mounting said stationary blade on said wall, said connecting member being swingably connected to said movable blade, hand grip means disposed at the upper portion of said handle, and pull means connected where said first link means and said second link means are linked, said pull means being operably connected with said grip means.

References Cited

UNITED STATES PATENTS

| | | | |
|---|---|---|---|
| 160,563 | 3/1875 | Billings | 30—251 |
| 1,140,020 | 5/1915 | Bradley | 30—171 X |
| 1,823,199 | 9/1931 | Huxman | 30—248 |
| 1,915,856 | 6/1933 | Himan | 30—235 |
| 2,957,297 | 10/1960 | Zoetemelk | 56—240 |
| 3,039,190 | 6/1962 | Wallace | 30—248 |

OTHELL M. SIMPSON, *Primary Examiner.*

J. C. PETERS, *Assistant Examiner.*